US012250763B2

(12) United States Patent
Lee

(10) Patent No.: US 12,250,763 B2

(45) Date of Patent: Mar. 11, 2025

(54) EUV LIGHT SOURCE DEVICE AND PLASMA GAS RECYCLING SYSTEM FOR HIGH-DENSITY PLASMA GENERATION

(71) Applicant: ESOL Inc., Hwaseong-si (KR)

(72) Inventor: Dong Gun Lee, Hwaseong-si (KR)

(73) Assignee: ESOL Inc., Hwaseong-si (KR)

( * ) Notice: Subject to any disclaimer, the term of this patent is extended or adjusted under 35 U.S.C. 154(b) by 410 days.

(21) Appl. No.: 17/833,905

(22) Filed: Jun. 7, 2022

(65) Prior Publication Data

US 2023/0371164 A1 Nov. 16, 2023

(30) Foreign Application Priority Data

May 12, 2022 (KR) ........................ 10-2022-0058373

(51) Int. Cl.
*H05G 2/00* (2006.01)

(52) U.S. Cl.
CPC ............. *H05G 2/008* (2013.01); *H05G 2/006* (2013.01)

(58) Field of Classification Search
CPC .......... H05G 2/00; H05G 2/006; H05G 2/003; H05G 2/008; G03F 7/70033
USPC .......................................... 250/504 R, 493.1
See application file for complete search history.

(56) References Cited

U.S. PATENT DOCUMENTS 6,194,733 B1 * 2/2001 Haas ...................... B82Y 10/00
250/492.2
2016/0128171 A1 * 5/2016 Kuritsyn ............. G03F 7/70916
250/504 R

FOREIGN PATENT DOCUMENTS

JP 2005-197082 A 7/2005
JP 2021-152601 A 9/2021

OTHER PUBLICATIONS

Office Action of Korean Patent Application No. 10-2022-0058373 mailed Sep. 19, 2023.

* cited by examiner

*Primary Examiner* — Jason L McCormack
(74) *Attorney, Agent, or Firm* — Revolution IP, PLLC

(57) ABSTRACT

An extreme ultraviolet (EUV) light source device for generating EUV light through a plasma reaction, includes: a focusing lens for focusing a laser beam generated from a laser source; a vacuum chamber for providing a vacuum environment to generate the laser beam focused on the focusing lens as the EUV light through the plasma reaction; a gas jet nozzle for supplying a plasma reaction gas to the laser beam focused on the focusing lens to generate the EUV light; and a gas supply part for supplying the plasma reaction gas to the gas jet nozzle from the outside.

5 Claims, 5 Drawing Sheets

EUV LIGHT SOURCE DEVICE AND PLASMA GAS RECYCLING SYSTEM FOR HIGH-DENSITY PLASMA GENERATION

CROSS REFERENCE TO RELATED APPLICATION OF THE INVENTION

The present application claims the benefit of Korean Patent Application No. 10-2022-0058373 filed in the Korean Intellectual Property Office on May 12, 2022 the entire contents of which are incorporated herein by reference.

BACKGROUND OF THE INVENTION

Field of the Invention

The present invention relates to an extreme ultraviolet (hereinafter referred to as EUV) light source device for generating a high-density plasma, a plasma gas recycling system, and an EUV mask inspection device, and more specifically, to an EUV light source device that is capable of localizing a density of gas in a plasma reaction for generating EUV light, thereby generating high-quality EUV light, and to a plasma gas recycling system that is capable of recycling the plasma gas used for generating the EUV light, thereby achieving a low production cost.

Background of the Related Art

As a level of integration of a semiconductor integrated circuit becomes high, a circuit pattern becomes fine, and accordingly, a photolithography device using visible light or ultraviolet ray, which is used in conventional practices, has lack of resolution. The resolution of the photolithography device in a semiconductor manufacturing process is proportional to the numerical aperture (NA) of a transfer optical system and inversely proportional to the wavelength of light used for a photolithography process. So as to enhance the resolution of the photolithography device, accordingly, photolithography and transfer have been tried by using EUV light having a short wavelength, instead of the visible light or ultraviolet ray. There are a laser-produced plasma EUV light source device and a discharge plasma EUV light source device that are applied as an EUV light source device used for the photolithography and transfer.

An EUV photolithography device makes use of EUV light having a wavelength of 13.5 nm, and a neon (Ne) plasma using Ne gas, which is used as a target material of a laser-produced plasma light source, has been widely studied and developed. This is because the Ne plasma has relatively high conversion efficiency (the ratio of EUV light intensity to input energy). Since Ne is a gas at room temperature, it undesirably may cause debris. Therefore, there is a limitation in using the Ne gas as the target material to obtain high-power EUV light, and to do this, accordingly, other materials may be desirably required.

An excited laser beam is absorbed when the laser-produced plasma EUV light is generated, and otherwise, the EUV light itself with the wavelength of 13.5 nm generated from a plasma is all absorbed in an atmosphere or a general focusing mirror, thereby failing to enhance the conversion efficiency of the EUV light as required. To improve the efficiency of the EUV light, accordingly, a vacuum environment under a given pressure ($<10^{-3}$ Torr) is needed, while using a focusing mirror and a lens coated with a given specific material.

Under the application of such conditions, therefore, there is a need to develop an EUV light source device using a laser-produced plasma, thereby enhancing the efficiency of the EUV light.

A stabilized EUV generation device using a plasma is disclosed in Korean Patent Application Laid-open No. 10-2011-0017579, and the conventional EUV generation device includes: a laser source for outputting a laser beam; a gas cell for receiving the laser beam from the laser source, receiving a reaction gas from a gas supply path corresponding to a section where a focus is made, forming a plasma using the laser beam and the reaction gas, and generating EUV light; a first vacuum chamber for accommodating the gas cell, while being kept at a given degree of vacuum; a second vacuum chamber serving as a space for receiving the EUV light generated from the gas cell to emit the EUV light to the outside, while being kept at a given degree of vacuum; a gas supply part for supplying the reaction gas for inducing the laser beam and the plasma to the gas supply path of the gas cell; a first vacuum pump and a second vacuum pump for forming the given degrees of vacuum of the first vacuum chamber and the second vacuum chamber; and a plurality of optical systems for transferring the laser beam generated from the laser source.

Under the above-mentioned configuration, the conventional EUV generation device may generate stabilized EUV light through the plasma reaction. The conventional EUV generation device has to allow the laser beam outputted from the laser source to be focused on a plasma reaction structure such as the gas cell so as to generate the EUV light using a gas plasma, and in this case, it is very important that the laser beam outputted has to be accurately aligned to the plasma inducing path of the gas cell so that the laser beam can be focused thereon.

However, the gas cell is entirely complicated in structure, thereby making it hard to design the gas cell structure, and further, laser alignment or mechanism arrangement processes may be complicatedly carried out. Under such complicated structure, moreover, a great number of parts have to be required to thus cause a high production cost, thereby disadvantageously making it hard to be applied to various industrial fields.

Under the application of such conditions, therefore, there is a need to develop a new EUV light source device using a laser-produced plasma, thereby enhancing the efficiency of the EUV light.

FIG. 1 shows a gas jet nozzle structure as a target of an EUV light source, which is disclosed in EP 1150169, and according to the conventional gas jet nozzle, a secondary gas jet generator is added to an existing gas jet generator to suppress the gas jet primarily generated from being dispersed, thereby improving the spatial localization of the gas jet primarily generated and preventing the gas jet nozzle from being damaged due to the plasma generated in the primary gas jet generator.

Due to the addition of the secondary gas jet generator, however, the conventional gas jet nozzle becomes complicated in structure and design, and as a gas line is added to the secondary gas jet generator, further, the entire system may be complicated in structure to thus cause a high production cost.

SUMMARY OF THE INVENTION

Accordingly, the present invention has been made in view of the above-mentioned problems occurring in the related art, and it is an object of the present invention to provide an EUV light source device for generating EUV light through a plasma reaction that is capable of improving the structure of a gas jet nozzle to provide the plasma reaction through which high-quality EUV light is generated, thereby being simplified in structure to thus remove the problems of an existing design with a relatively complicated structure and a system complicated in configuration applied to the existing design.

It is another object of the present invention to provide a recycling system that is capable of recycling high-priced gas used for a plasma reaction to thus achieve a low production cost.

To accomplish the above-mentioned objects, according to the present invention, there is provided an EUV light source device for generating a high-density plasma to create EUV light through a plasma reaction, including: a focusing lens for focusing the laser beam generated from a laser source; a vacuum chamber for providing a vacuum environment to generate the laser beam focused on the focusing lens as the EUV light through the plasma reaction; a gas jet nozzle for supplying a plasma reaction gas to the laser beam focused on the focusing lens to generate the EUV light; and a gas supply part for supplying the plasma reaction gas to the gas jet nozzle from the outside, wherein the gas jet nozzle may include a gas jet nozzle body, a gas receiver disposed on one side of the gas jet nozzle body and adapted to receive the plasma reaction gas from the gas supply part to inject the plasma reaction gas, and gas injectors for injecting the plasma reaction gas received from the gas receiver into a plasma reaction target to allow the plasma reaction gas to be focused on the center of the light transmitted through the focusing lens.

According to the present invention, desirably, the gas injectors of the gas jet nozzle may include a first transfer path communicating with the gas receiver and having an enlarged longitudinal section by a given length from the gas receiver, and a second transfer path for generating shock waves from the plasma reaction gas supplied from the first transfer path.

According to the present invention, desirably, the gas jet nozzle may be adapted to inject the plasma reaction gas received from the gas receiver into the center of an injection direction thereof through the first transfer path and the second transfer path.

According to the present invention, desirably, the first transfer path may have a circular cross-section.

According to the present invention, desirably, the gas jet nozzle may include a first transfer path having an enlarged longitudinal section by a given length from the gas receiver for receiving the plasma reaction gas from the gas supply part, and a second transfer path extending from the end of the first transfer path and having a horizontal longitudinal section by a given length to generate shock waves.

According to the present invention, desirably, the first transfer path may be longer in length than the second transfer path.

According to the present invention, desirably, the EUV light source device may further include a first optical system for expanding the light generated therefrom, a second optical system for allowing the light reflected from the first optical system to be incident thereon to convert the incident light into focused light for an EUV mask as an inspection object, a moving part for moving the EUV mask in an X-axis or Y-axis direction to thus irradiate the light incident on the second optical system on the EUV mask and to measure a mask pattern, and a photodetector for allowing the light on which the measurement light irradiated on the EUV mask is reflected to be incident thereon to detect the measured intensity of light energy.

According to the present invention, desirably, the gas supply part may further include a recycling system for purifying the plasma reaction gas collected from the vacuum chamber through a purifier to supply the collected plasma reaction gas to the gas jet nozzle.

According to the present invention, desirably, the recycling system may include a vacuum pump for controlling a vacuum of the vacuum chamber providing the vacuum environment for the EUV light source device, the purifier for purifying the plasma reaction gas exhausted from the vacuum pump, a booster pump for compressing the plasma reaction gas purified through the purifier, a storage device for storing the plasma reaction gas compressed through the booster pump, and a regulator for controlling the pressure of the plasma reaction gas stored in the storage device to supply the plasma reaction gas to the gas jet nozzle.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE EMBODIMENTS

Hereinafter, explanations of an EUV light source device for generating a high-density plasma, a plasma gas recycling system, and an EUV mask inspection device according to the present invention will be given in detail with reference to the attached drawings.

According to the present invention, there is provided an EUV light source device for generating EUV light through a plasma reaction, including: a focusing lens for focusing the laser beam generated from a laser source; a vacuum chamber for providing a vacuum environment to generate the laser beam focused on the focusing lens as the EUV light through the plasma reaction; a gas jet nozzle for supplying a plasma reaction gas to the laser beam focused on the focusing lens to generate the EUV light; and a gas supply part for supplying the plasma reaction gas to the gas jet nozzle from the outside, wherein the gas jet nozzle includes a gas jet nozzle body, a gas receiver disposed on one side of the gas jet nozzle body and adapted to receive the plasma reaction gas from the gas supply part to inject the plasma reaction gas, and gas injectors for injecting the plasma reaction gas received from the gas receiver into a plasma reaction target to allow the plasma reaction gas to be focused on the center of the light transmitted through the focusing lens.

In addition to the EUV light source device for generating high-quality EUV light through the generation of high-density plasma, according to the present invention, a plasma reaction gas recycling system for operating the EUV light source device at a low cost and an EUV light source inspection device for inspecting defects of EUV blank masks, EUV masks, and EUV pellicles to which the EUV light source device is applied to improve the inspection performance are further provided, so that the high-quality EUV light is applied to the processes of various semiconductor industries such as defect inspection processes of the EUV blank masks, EUV masks, and EUV pellicles, photolithography, and the like, thereby achieving the improvements in the processes.

Figure 1:
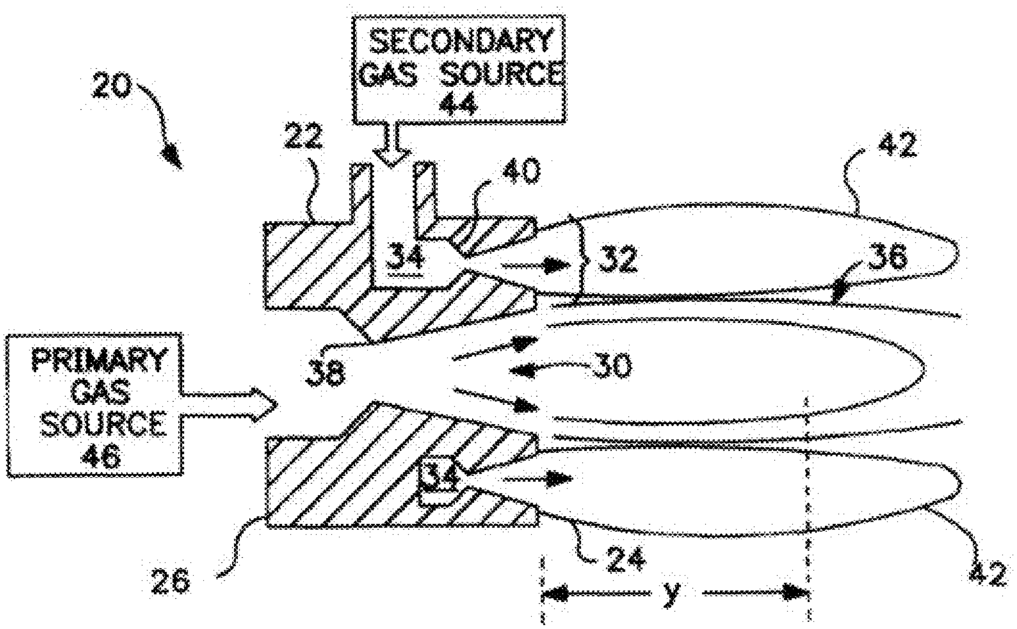
FIG. 1 is a detailed diagram showing a gas jet structure for a plasma reaction of an EUV light source device in a conventional technology.
Figure 2:
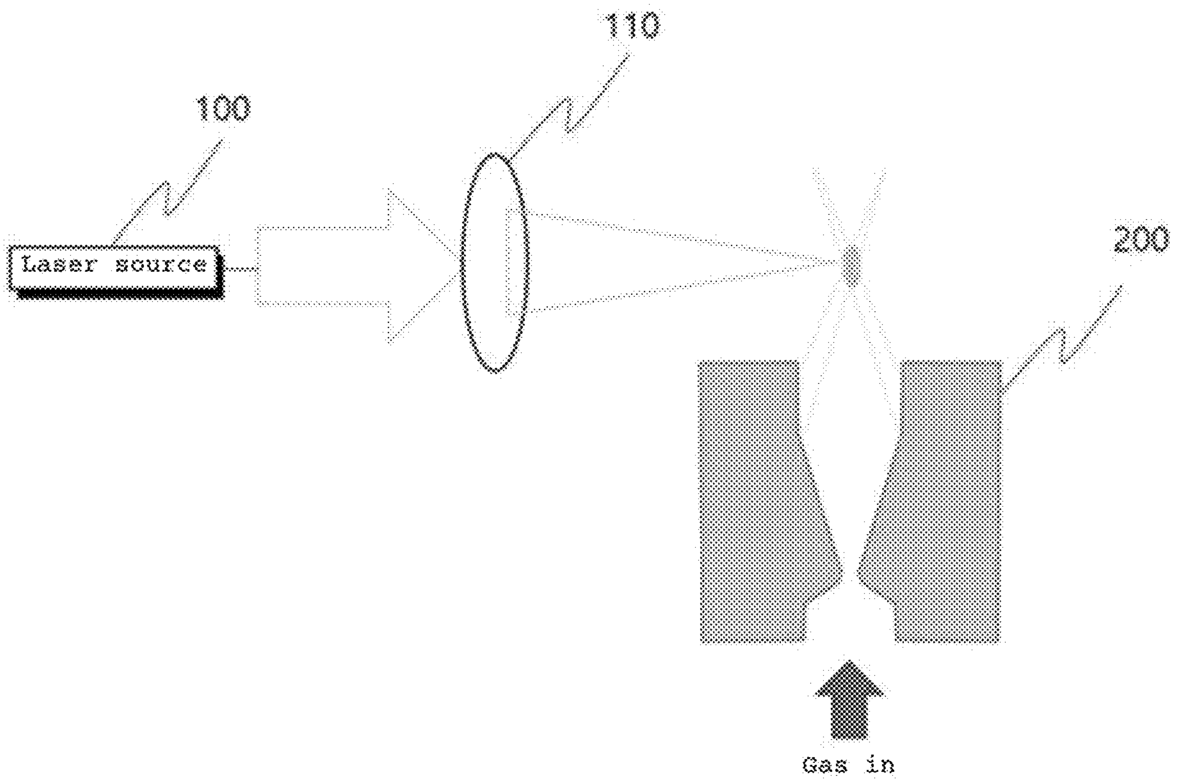
FIG. 2 is a schematic diagram showing an EUV light source device for generating a high-density plasma according to the present invention.

FIG. 2 is a schematic diagram showing an EUV light source device for generating a high-density plasma according to the present invention.

An EUV light source device for generating a high-density plasma according to the present invention is provided with injection parts of a gas jet nozzle to induce a high-density plasma reaction through a plasma reaction gas, thereby generating high-quality EUV light.

The EUV light source device according to the present invention includes a laser source 100, a focusing lens 110 for focusing the light generated from the laser source 100, and a gas jet nozzle 200 for supplying a plasma reaction gas to obtain EUV light through a plasma reaction using gas focusing.

Desirably, coherent EUV light, which is monochromatic light and has excellent spatial coherence, is used as the light generated from the laser source 100. According to exploratory experiments and documents, light generated from various devices may be applied in the present invention, but the light adequate in the industrial fields is the EUV light generated by high-order harmonic generation.

The light using the high-order harmonic generation is generated by irradiating a laser beam (for example, Nd:YAG laser beam) having several tens to hundreds of femtosecond pulse widths on an inert gas (a plasma reaction gas) formed on a local area in a vacuum device, and as known, the applied gas is Ne (Neon) and He (Helium), which is adequate in generating the EUV light.

According to the present invention, in this case, the configuration of the gas jet nozzle 200 is improved with injection parts for injecting the plasma reaction gas so that the focused laser bean is irradiated on a high-density localized target to thus generate the EUV light, and the gas jet nozzle 200 according to the present invention is configured to generate shock waves.

According to the present invention, the EUV light is generated by using the gas jet nozzle 200 for generating the shock waves, so that the gas jet nozzle 200 is more simplified in structure than the existing gas jet nozzle complicated in structure, thereby generating high-quality EUV light to thus achieve a high resolution process in a defect inspection device or a photolithography device.

Therefore, the EUV light source device according to the present invention is constituted of the laser source 100 for generating the laser beam, the focusing lens 110 for focusing the laser beam generated from the laser source 100, and the gas jet nozzle 200 for generating the EUV light through the plasma reaction. Now, an explanation of the gas jet nozzle 200 will be given in detail with reference to FIG. 3.

Figure 3:
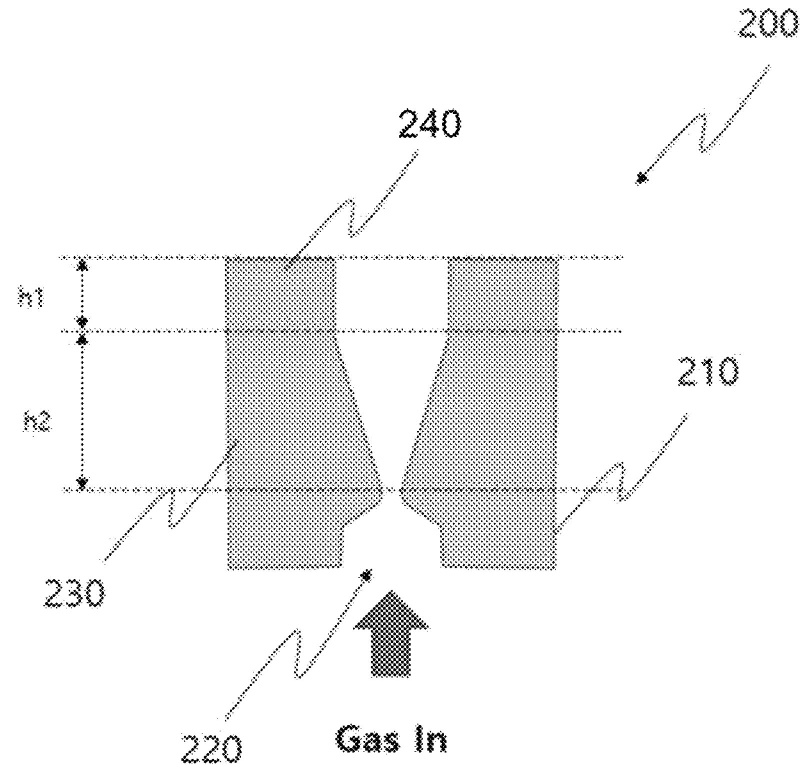
FIG. 3 is a sectional view showing a gas jet nozzle of the EUV light source device for generating a high-density plasma according to the present invention.

FIG. 3 is a sectional view showing the gas jet nozzle of the EUV light source device for generating high-density plasma according to the present invention. The EUV light source device according to the present invention selects a gas jet supply method among various gas supply methods for generating EUV light through the supply of plasma reaction gas, and accordingly, the gas jet nozzle 200 as shown in FIG. 3 is provided.

In specific, the gas jet nozzle 200 includes a gas jet nozzle body 210, a gas receiver 220 to which the plasma reaction gas is supplied from an outside gas supply part, and injection parts (transfer paths) communicating with the gas receiver 220 to inject the plasma reaction gas supplied, and in this case, the transfer paths include a first transfer path 230 and a second transfer path 240, which are the injection parts adapted to collect the plasma reaction gas to the center of the gas jet nozzle 200 to generate the shock waves.

Through the first transfer path 230 and the second transfer path 240 as the injection parts, in this case, the shock waves of the plasma reaction gas are generated. In specific, the first transfer path 230 has an enlarged longitudinal section by a given length from the gas receiver 220, and the second transfer path 240 extends from the end of the first transfer path 230 and has a horizontal longitudinal section by a given length. The first transfer path 230 serves to primarily expand the plasma reaction gas received, and through the second transfer path 240, the transfer area of the plasma reaction gas is reduced to increase the pressure of the plasma reaction gas so that the plasma reaction gas is controlled in direction and pressure to thus generate the shock waves.

Further, the first transfer path 230 and the second transfer path 240 desirably have circular cross-sections, and the first transfer path 230 is longer in length than the second transfer path 240, thereby determining the pressure of the plasma reaction gas transferred.

Through the gas jet nozzle with the above-mentioned structure according to the present invention, the high-density plasma reaction gas is injected into the reaction target as the focused laser beam, thereby generating excellent EUV light under the simplified gas jet nozzle structure.

Figure 4:
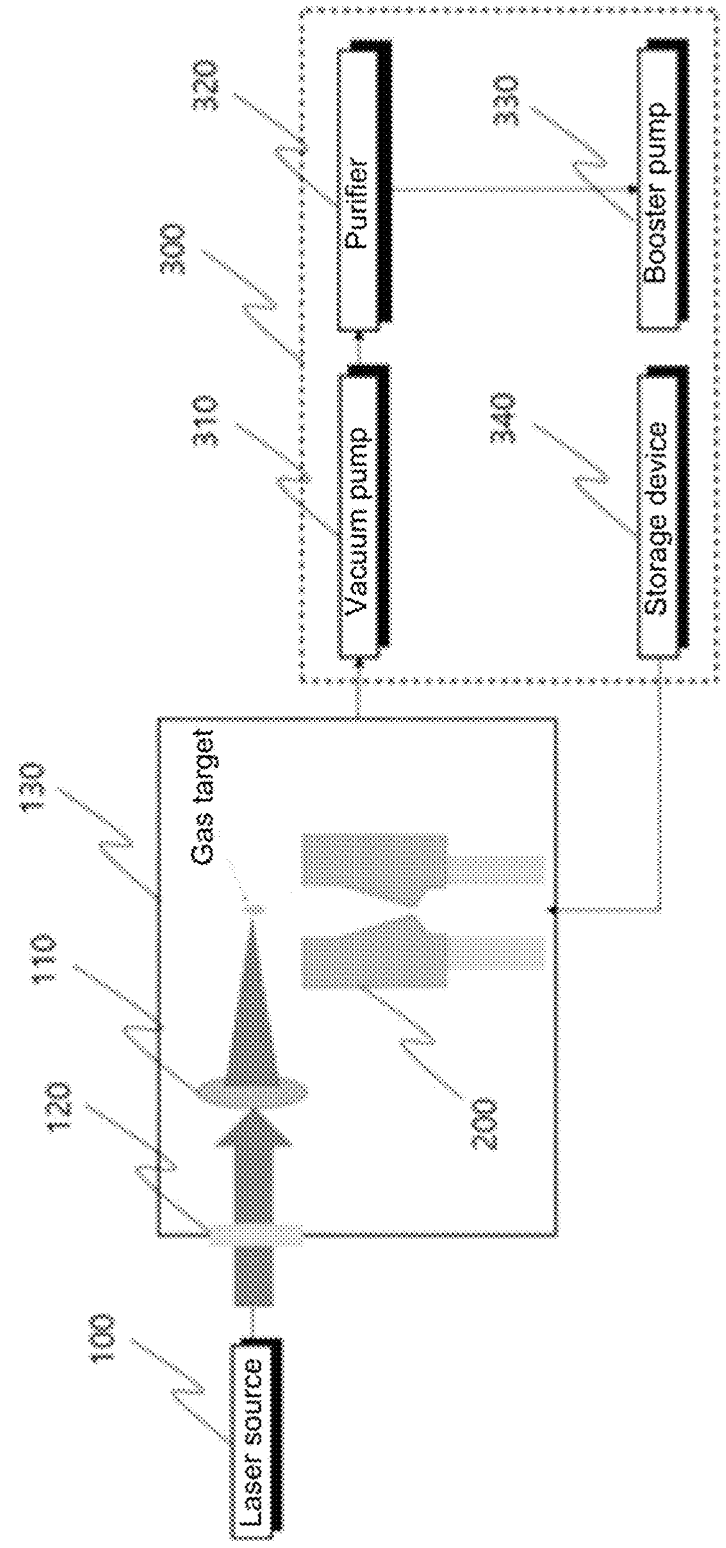
FIG. 4 is a block diagram showing a plasma gas recycling system for the EUV light source device for generating a high-density plasma according to the present invention.

FIG. 4 is a block diagram showing a plasma gas recycling system for the EUV light source device for generating high-density plasma according to the present invention.

While the high harmonic EUV light is being generated using the plasma reaction gas, further, a recycling system where plasma reaction gas collection and supply methods are all applied is provided to efficiently use the plasma reaction gas.

In generating the EUV light through the gas jet nozzle, a substantially large amount of plasma reaction gas is consumed, and accordingly, if the plasma reaction gas is just exhausted, a high cost may be needed in the process of generating the EUV light. According to the present invention, therefore, the cost of generating the EUV light through the application of the gas jet nozzle can be reduced through plasma reaction gas collection and resupply.

The recycling system is a system having both of the gas supply part and a recycling system 300, and as shown, the recycling system 300 includes a vacuum pump 310 for controlling a vacuum of a vacuum chamber 130 providing a vacuum environment for the plasma reaction, a purifier 320 for removing foreign matters of the plasma reaction gas exhausted from the vacuum pump 310, a booster pump 330 for compressing the purified plasma reaction gas, and a storage device 340 for storing the compressed plasma reaction gas to supply the plasma reaction gas to the gas jet nozzle 200.

The recycling system 300 collects the plasma reaction gas remaining in the vacuum chamber 130 after the EUV light has been generated through the plasma reaction in the vacuum chamber 130 and then supplies the collected plasma reaction gas to the gas jet nozzle 200 again, thereby providing plasma reaction gas supply and recycling, and accordingly, the high-priced plasma reaction gas can be continuously reused, thereby achieving production cost reduction.

In the vacuum chamber 130, further, a window 120 is provided to allow the laser beam generated from the laser source 100 to be incident on the vacuum chamber 130, and as mentioned above, the focusing lens 110 for focusing the incident laser beam and the gas get nozzle 200 for supplying the plasma reaction gas are provided in the vacuum chamber 130, thereby generating the EUV light.

Figure 5:
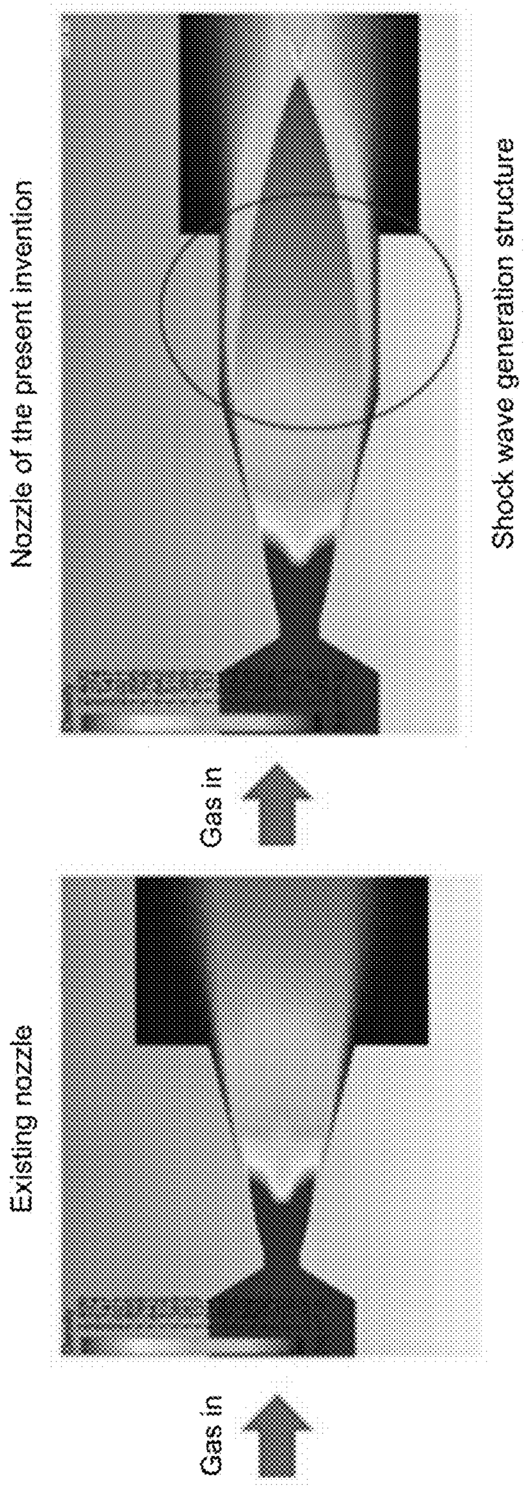
FIG. 5 shows gas density distribution through the EUV light source device for generating a high-density plasma according to the present invention.
Figure 6:
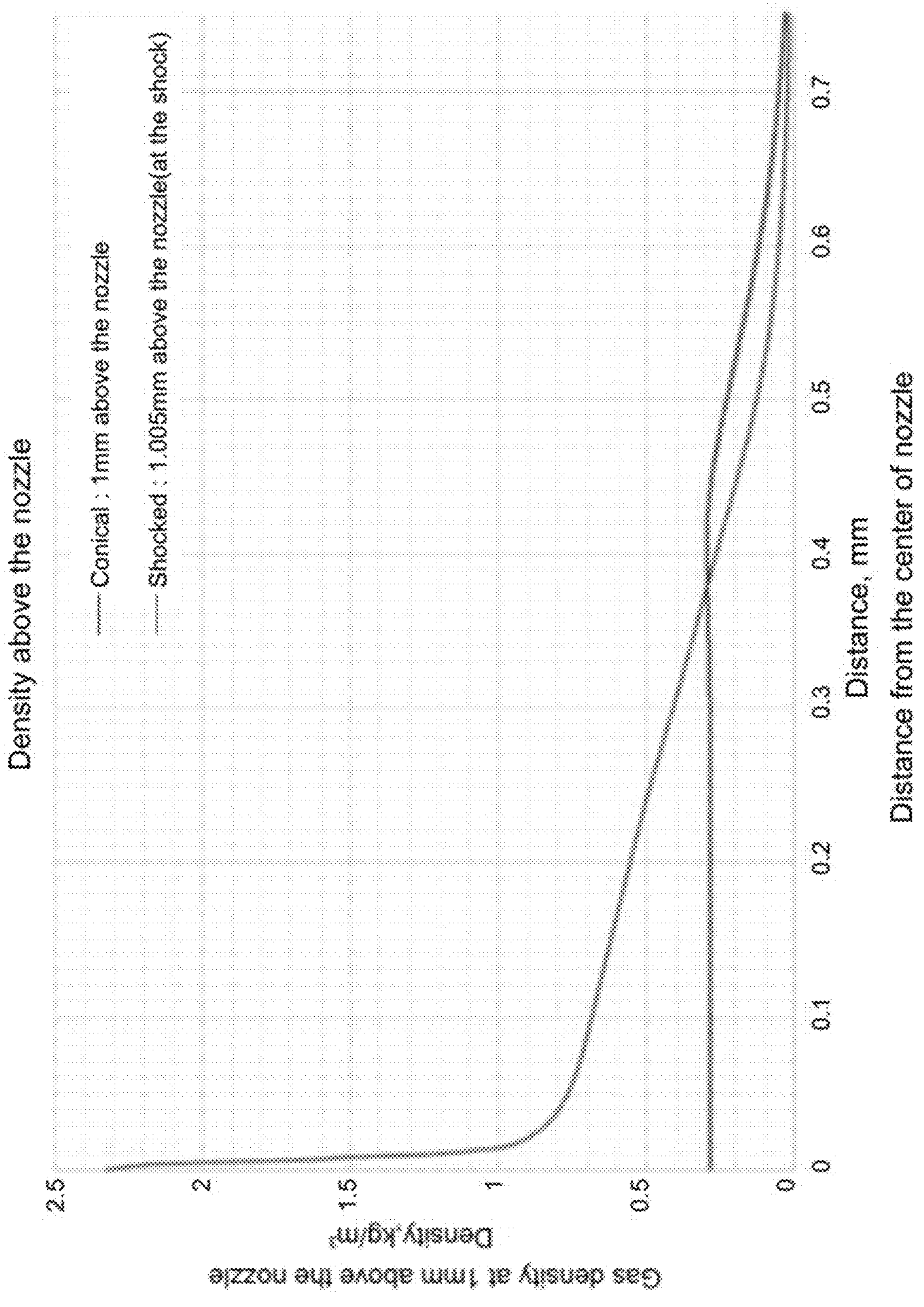
FIG. 6 shows gas density distribution from the gas jet nozzle of the EUV light source device according to the present invention.

FIG. 5 shows gas density distribution through the EUV light source device for generating high-density plasma according to the present invention, and FIG. 6 shows gas density distribution from the gas jet nozzle of the EUV light source device according to the present invention.

As shown in FIG. 5, gas density distribution using the existing gas jet nozzle is provided, and according to the present invention, the EUV light generation efficiency is improved through the gas localization under the generation of the shock waves, thereby improving the brightness of the EUV light.

FIG. 6 shows the calculation results of the gas density distribution. As shown, the gas density (indicated with blue color) calculated from the center of the nozzle is 2.4 $kg/m^3$, and contrarily, the gas density (indicated with red color) calculated from the center of the existing nozzle is 0.3 $kg/m^3$, which causes a density difference of about 2.1 $kg/m^3$ therebetween. Therefore, it can be appreciated that the EUV light source device according to the present invention can generate very excellent EUV light through the gas jet nozzle.

According to the present invention, further, an EUV inspection device to which the EUV light source device and the recycling system as mentioned above are applied may be provided, and the EUV inspection device may include an EUV optical system having at least two or more focusing optical systems, a stage (moving part) for determining the position of an EUV mask or EUV pellicle as an inspection object, and a photodetector for detecting the amount of EUV light reflected from the inspection object. As the EUV light source device according to the present invention is applied to the EUV inspection device, in this case, excellent inspection performance can be ensured.

As described above, the EUV light source device for generating the EUV light according to the present invention can provide the high-density plasma reaction gas for the plasma reaction to the reaction target, thereby generating high-quality EUV light, and to do this, of course, the EUV light source device according to the present invention is simplified in structure by changing only the structure of the gas jet nozzle.

According to the present invention, further, the high-priced plasma reaction gas used for the plasma reaction is collected and recycled through the recycling system, thereby making it possible to economically operate the EUV system.

According to the present invention, in addition, the high-quality EUV light is applied to the inspection device for inspecting the defects of EUV masks, blank masks, and pellicles, thereby improving the inspection performance.

The embodiments of the present invention have been disclosed in the specification and drawings. In the description of the present invention, special terms are used not to limit the present invention and the scope of the present invention as defined in claims, but just to explain the present invention. Therefore, persons skilled in the relevant art can appreciate that many modifications and variations are possible in light of the above teachings. It is therefore intended that the scope of the invention be limited not by this detailed description, but rather by the claims appended hereto.

What is claimed is:

1. An extreme ultraviolet (EUV) light source device for generating a high-density plasma to produce EUV light through a plasma reaction, comprising:

a focusing lens for focusing a laser beam generated from a laser source;

a vacuum chamber for providing a vacuum environment to generate the laser beam focused on the focusing lens as the EUV light through the plasma reaction;

a gas jet nozzle for supplying a plasma reaction gas to the laser beam focused on the focusing lens to generate the EUV light; and a gas supply part for supplying the plasma reaction gas to the gas jet nozzle from the outside, wherein the gas jet nozzle comprises:

a gas jet nozzle body;

a gas receiver disposed on one side of the gas jet nozzle body and adapted to receive the plasma reaction gas from the gas supply part to inject the plasma reaction gas; and gas injectors for injecting the plasma reaction gas received from the gas receiver into a plasma reaction target to allow the plasma reaction gas to be focused on the center of the light transmitted through the focusing lens, the gas injectors comprising:

a first transfer path having an enlarged longitudinal section by a given length from the gas receiver; and a second transfer path extending from an end of the first transfer path and having a horizontal longitudinal section by the given length to generate shock waves, wherein the first transfer path is longer in length than the second transfer path, and the first and second transfer paths are configured to inject the plasma reaction gas received from the gas receiver into a center of an injection direction thereof.

2. The EUV light source device according to claim 1, wherein both the first transfer path and the second transfer path have a circular cross-section.

3. The EUV light source device according to claim 1, wherein the shock waves are generated at a boundary between the first transfer path and the second transfer path.

4. The EUV light source device according to claim 1, wherein the first transfer path has a gradually increasing diameter from the gas receiver to the second transfer path, and the second transfer path maintains a constant diameter.

5. The EUV light source device according to claim 4, wherein the gas supply part further includes a recycling system for purifying the plasma reaction gas collected from the vacuum chamber through a purifier to supply the collected plasma reaction gas to the gas jet nozzle.

* * * * *